May 5, 1953  R. H. LONG ET AL  2,637,425
TRANSMISSION OPERATING MECHANISM
Filed May 25, 1951  2 SHEETS—SHEET 1

INVENTORS
RICHARD H. LONG
BY EDWIN E. PRATHER
H. O. Clayton
ATTORNEY

May 5, 1953  R. H. LONG ET AL  2,637,425
TRANSMISSION OPERATING MECHANISM
Filed May 25, 1951                                           2 SHEETS—SHEET 2

INVENTORS
RICHARD H. LONG
BY EDWIN E. PRATHER
H. O. Clayton
ATTORNEY

Patented May 5, 1953

2,637,425

UNITED STATES PATENT OFFICE 2,637,425

TRANSMISSION OPERATING MECHANISM

Richard H. Long and Edwin E. Prather, South Bend, Ind., assignors to Bendix Aviation Corporation, South Bend, Ind., a corporation of Delaware Application May 25, 1951, Serial No. 228,258

1 Claim. (Cl. 192—.092)

This invention relates in general to the power transmission mechanism of the power plant of an automotive vehicle and in particular to power and manually operated means for operating the change speed transmission of said power plant and for operating the throttle and the friction clutch to facilitate the operation of the transmission.

One of the objects of our invention is to provide, in an automotive vehicle including a three speeds forward and reverse transmission, a simple mechanism, power operated in part, for operating said transmission, all of the settings thereof being effected by a manual operation of said mechanism and the second gear setting of the transmission, and the operation of the throttle and friction clutch to facilitate said setting, being automatically effected by power means when the vehicle is slowed down to a certain speed, the transmission at the time being established in a certain setting preferably the high gear setting.

A further object of our invention is to provide, in an automotive vehicle including an accelerator, a friction clutch, an engine controlling throttle, and a three speeds forward and reverse transmission, means for operating and for facilitating the operation of said transmission, said means including power means, comprising two separate pressure differential operated motors one of which is automatically operable, when the accelerator is released, to disengage the clutch, and the other of which is operable, when the transmission is established in its high gear setting, the clutch operating motor is energized, and the vehicle speed is reduced to a certain factor, to establish the transmission in its second gear setting, the friction clutch and the throttle being operated to facilitate this operation of the transmission, said means further including manually operated means for effecting any one of the gear settings of the transmission.

Other objects of the invention and desirable details of construction and combination of parts of the aforementioned mechanism, will become apparent from the following description of a preferred embodiment of our invention, which description is taken in conjunction with the accompanying drawings, in which.

Figure 1:
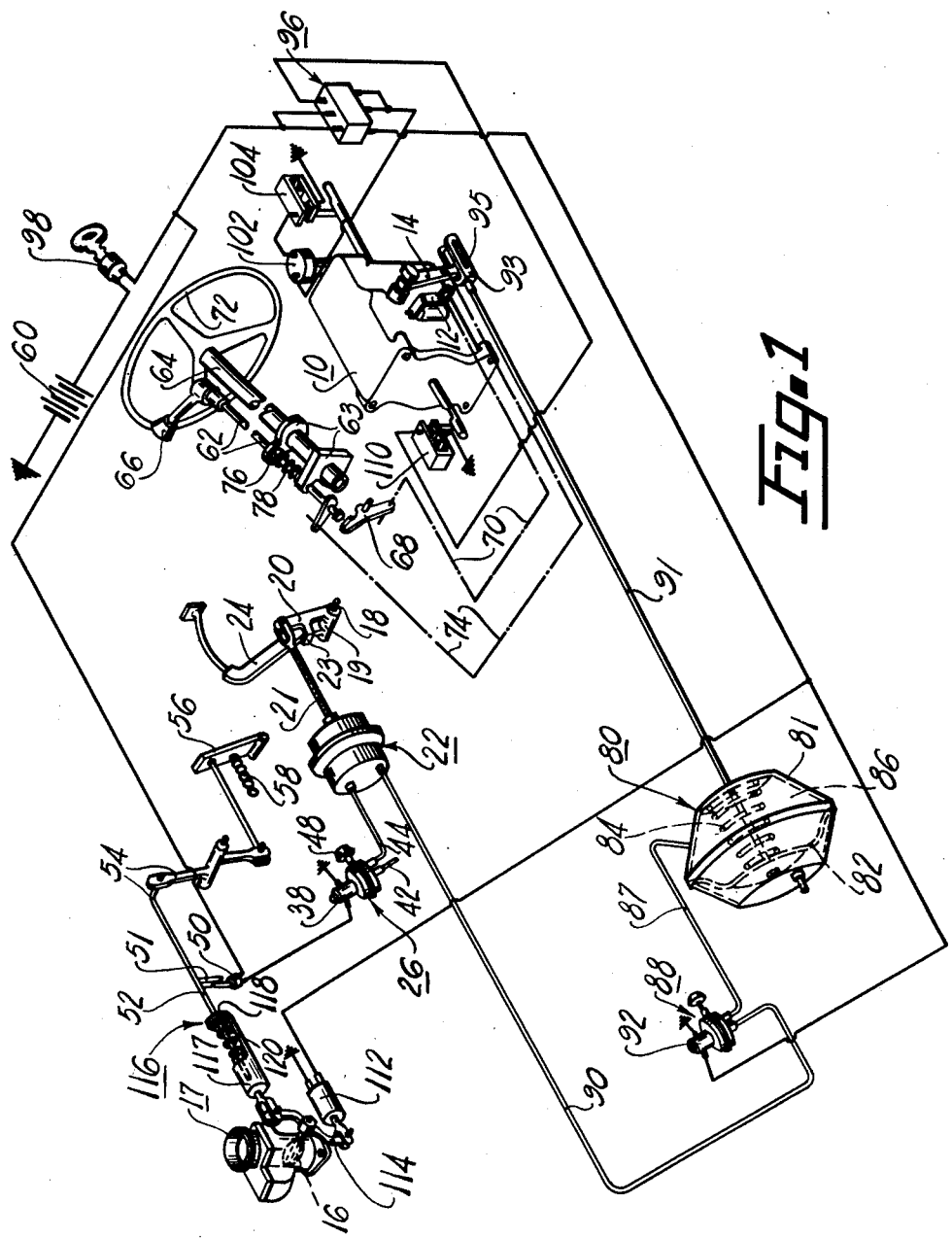
Figure 1 is a diagrammatic view of my invention disclosing the principal features thereof.

Referring now to Figure 1 disclosing a preferred embodiment of our invention, a three speeds forward and reverse transmission 10 is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

Our invention has to do with the manually and power operated means for actuating the aforementioned transmission operating cranks 12 and 14, for operating the engine throttle valve 16 of the carburetor 17, and for operating a conventional friction clutch, not shown, said clutch including the usual driving and driven plates forced into engagement by clutch springs. The aforementioned transmission and the clutch are of conventional design, accordingly, no claim is made thereto and the same are not disclosed in the drawings.

The friction clutch, not shown, is operably connected to a clutch throw out shaft 18 to which is keyed a sleeve 19; and to a crank 20, fixedly secured to said sleeve, there is pivotally connected a connecting member 21. The member 21 is connected to the power element, not shown, of a single acting vacuum motor 22; and a clutch pedal 24 operated by the physical effort of the driver, contacts a flange 23 extending from the crank 20 thereby providing means for disengaging the clutch at the will of the driver.

Figure 3:
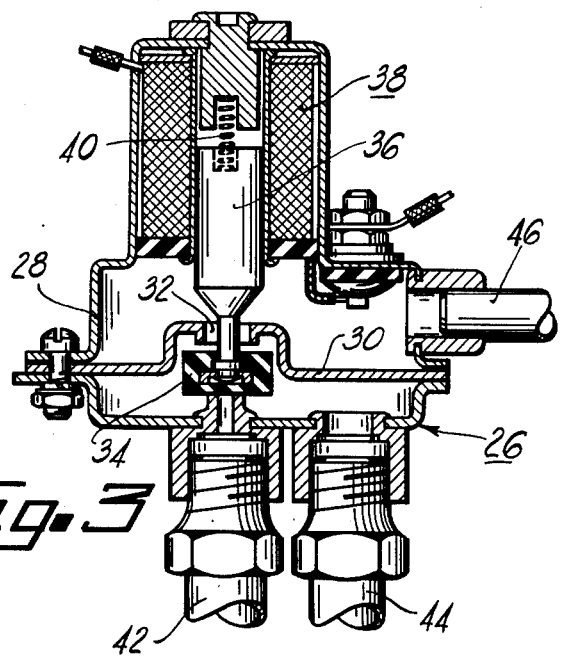
Figure 3 is a sectional view disclosing details of the valve mechanism of our invention.

The clutch operating vacuum motor 22 is controlled by a solenoid operated three way valve 26 disclosed in detail in Figure 3. This valve includes a two part casing 28 having clamped therebetween a partition 30. An opening 32 in the latter member is adapted to be closed by a valve member 34 mounted on the end of the armature 36 of a solenoid 38. A spring 40 serves to bias the valve member 34 downwardly to close the valve and when the solenoid is energized said valve member is seated thereby opening the valve that is interconnecting a conduit 42 with a conduit 44 the former being connected to the intake manifold of the internal combustion engine of the vehicle and the latter being connected to the clutch operating motor 22. As to the closing of the valve when the spring 40 operates to move the valve member downwardly the motor 22 is vented to the atmosphere via an air cleaner 48, a conduit 46, the interior of the valve casing, the opening 32 and the conduit 44.

As to the control of the solenoid 38 this is effected by means comprising a switch 50 which is closed by a flange 51 secured to a link 52 the latter constituting a part of the linkage, indicated generally by the reference numeral 54, for operating the throttle 16 of the carburetor. A release of the accelerator 56 of the vehicle, by the operation of a return spring 58 serves to close the throttle; and this operation also serves to close the switch 50. The switch 50 is preferably electrically connected in series with a grounded battery 60, the ignition switch 98 of the vehicle, and the grounded valve operating solenoid 38; accordingly, when the accelerator 56 is released the solenoid 38 is energized thereby opening the valve 26 to effect an energization of the motor 22; and the latter operation effects a disengagement of the clutch. On the other hand a depression of the accelerator to open the throttle serves to open the switch 50 thereby effecting an opening of the valve 26 to effect a deenergization of the motor 22; and the latter operation serves to make possible a reengagement of the clutch.

The essence of our invention lies in the means for operating the transmission; the aforementioned power means for operating the clutch constituting a part thereof.

One of the features of our invention lies in the means, actuated by the physical effort of the driver, for operating the transmission 10 and this means includes a rod 62 mounted in bracket 63 secured to the steering post 64 of the vehicle. An upward movement of a shift lever 66 serves to move the rod 62 downwardly thereby moving the end of said rod into contact with one end of a lever 68. This operation, known as a cross shift operation of the mechanism, serves to rotate the lever 68 thereby effecting, thru the intermediary of force transmitting linkage 70, an actuation of the crank 12 to effect a low, reverse rail selecting operation of the transmission 10. A subsequent rotation of the shift lever 66 in a plane parallel or substantially parallel to the steering wheel 72, serves, thru the intermediary of force transmitting linkage 74, to actuate the crank 14 to establish the transmission in gear, that is either low gear or reverse gear. In this operation of the shifter mechanism a stop 76 secured to the rod 62 contacts a spring 78; and the downward movement of the rod then serves to compress said spring; accordingly a subsequent release of the shift lever, after moving the same to its transmission neutral position, results in a rotation of the crank 12, by the expansion of the spring 78, to effect a second and high gear cross shift operation of the transmission.

Describing now the most important feature of our invention there is provided power means, cooperating with the aforementioned manually operated shifter means, for automatically shifting the transmission from its high gear setting to its second gear setting when the speed of the vehicle is reduced to a certain factor say 15 miles per hour. To this end there is provided a single acting vacuum operated motor 80 comprising a casing 81 and a power element 82 the latter being biased to its high gear position by a spring 84. A conduit 87 serves to place the control chamber 86 of the motor in fluid transmitting connection with a solenoid operated three way valve 88 duplicating the previously described control valve 26; and the valve 88 is in turn placed in fluid transmitting connection with the control chamber of the clutch operating motor 22 by means of a conduit 90. The crank 14 is operatively connected to the power element 82 by means of a rod 91 having a slotted yoke 93 mounted on its end. A pin 95 extending laterally from the lower end of the crank 14 fits with the slot of the yolk 93 and when the motor 80 is vacuum energized the rod 91 and yolk 93 move to the right, Figure 1, to rotate the crank 14 to establish the transmission in its second gear setting.

Figure 2:
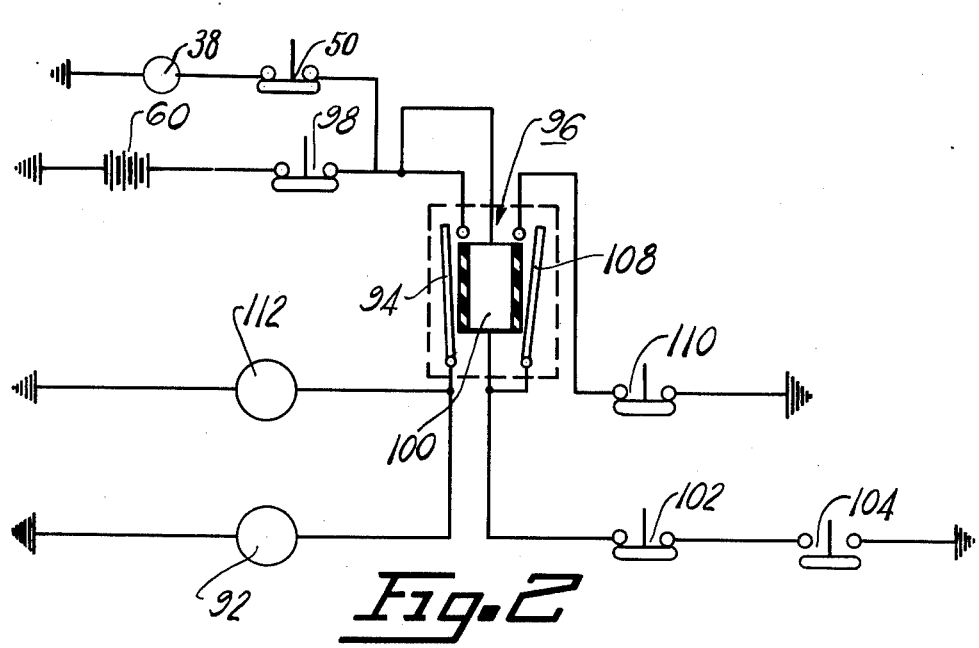
Figure 2 is a wiring diagram of the electrical mechanism disclosed in Figure 1.

As to the means for controlling the valve 88 this control means is preferably electrical and includes a grounded solenoid 92 which is preferably a duplicate of the solenoid 38 of Figure 3. As disclosed in Figure 2 the solenoid 92 is electrically connected in series with a normally open switch 94 of a relay 96, the ignition switch 98, and the grounded battery 60. The coil 100 of the relay is preferably electrically connected in series with the battery 60, the ignition switch 98, a vehicle speed responsive governor operated switch 102, and a grounded switch 104 which is normally open and which is closed only when the transmission is established in its high gear setting. The transmission 10 and the shifter mechanism for operating the same are disclosed in Figure 1 in the high gear position. As to the governor operated switch 102 the same may be of any of the well known breaker switches of the day, said switch being actuated by anyone of the well known governor mechanisms of the day. Suffice it to say that as the speed of the vehicle is lowered when the speed reaches a certain factor, say 15 miles per hour, then the governor is operative to close the switch 102 thereby effecting the second gear setting of the transmission.

Describing another feature of my invention there is provided a normally open relay switch 108 which is electrically connected in series with a grounded normally closed transmission operated switch 110 said switch being opened when and only when the transmission is established in its second gear setting. With the inclusion of the switch 110 in the electrical controls there is provided a hold down relay mechanism inasmuch as the switch 108 is automatically closed when the coil 100 is energized thereby insuring a completion of the second gear operation of the motor 80 once initiated; for the switch 110 is closed except when the transmission is established in second gear and when the switch 110 is closed the coil 100 remains energized, to energize the solenoid 92, until said switch is again opened.

There is also included, in the mechanism of our invention, means for automatically closing the throttle valve 16 when the mechanism is in the process of operating the transmission. Describing this mechanism which is disclosed in Figure 1, there is provided a grounded solenoid motor 112 electrically connected in parallel with the grounded solenoid 92. The armature of this motor is pivotally connected to the lower end of a crank 114, the upper end of said crank being pivotally connected to a lost motion connection 116. One end of the rod 52 slidably extends through a flange 118 at the end of a force transmitting member 117. This member is pivotally connected to the crank 114 and is hollowed out to slidingly receive the end of the rod 52. A flange member 118, secured to the rod 52, abuts a spring 120 which is sleeved over said rod.

There is thus provided a relatively simple shifter mechanism of few moving parts and controls, the shift lever 66 and accelerator 56 being the only controls which call for operation by the driver. With the mechanism of our invention the transmission may, after the accelerator is released to disengage the clutch, be establishd in any one of its settings by the physical effort of the driver. The transmission having been operated the clutch is then reengaged by a depression of the accelerator. Then with the transmission established in its high gear setting the power means takes over the control to automatically effect a second gear setting of the transmission when the speed of the vehicle is reduced to a certain factor; and the mechanism, including the switch 108 and cooperating switch 110, is such as to insure a completion of this operation once initiated. It is also to be noted that with the mechanism of my invention the motor 80 is not operative to place the transmission in second gear until after the clutch operating motor 22 is energized to disengage the clutch.

We claim:

In an automotive vehicle the combination, with an accelerator, a multi speed transmission, means operated by the physical effort of the driver for operating the transmission, a clutch, and a vehicle speed responsive governor, of power means for operating the transmission to establish the same in a certain setting and thereby supplement the operation of the transmission by the physical effort of the driver, said power means including a motor for operating the clutch, means, including an accelerator operated control means, for controlling the operation of said motor, a motor for operating the transmission, means interconnecting said motors whereby the transmission operating motor may be energized to operate the transmission when and only when the clutch operating motor is energized, and means supplementing the latter means and operative, together with said latter means, to control the operation of the transmission operating motor and including a relay comprising a coil and two normally open switches, means connected in series with said coil and including a battery, a governor operated switch which is closed when the vehicle speed is reduced to or below a certain factor, and a switch which is closed by the transmission when the same is established in a certain setting; together with electrical means interconnecting, in series, the battery, one of the relay switches, and a part of the means interconnecting the two motors.

RICHARD H. LONG.
EDWIN E. PRATHER.

References Cited in the file of this patent

UNITED STATES PATENTS

| Number | Name | Date |
|---|---|---|
| 2,195,365 | Getaz | Mar. 26, 1940 |
| 2,234,463 | Brewer | Mar. 11, 1941 |
| 2,261,898 | Barkeij | Nov. 4, 1941 |
| 2,492,923 | Moore et al. | Dec. 27, 1949 |